United States Patent [19]

Cornell

[11] 4,157,361
[45] Jun. 5, 1979

[54] ABS COMPOSITION HAVING IMPROVED IMPACT STRENGTH AND WEATHER AGING RESISTANCE AND LATEX SUSPENSION PROCESS THEREFOR

[75] Inventor: Robert J. Cornell, Naugatuck, Conn.

[73] Assignee: Uniroyal, Inc., New York, N.Y.

[21] Appl. No.: 897,090

[22] Filed: Apr. 17, 1978

Related U.S. Application Data

[62] Division of Ser. No. 560,783, Mar. 21, 1975, Pat. No. 4,107,234.

[51] Int. Cl.$^2$ ............................ C08L 9/02; C08L 9/06
[52] U.S. Cl. ...................... 260/876 R; 260/33.6 AQ; 260/45.95 R; 260/880 R
[58] Field of Search ................ 260/876 R, 879, 880 R

[56] References Cited

U.S. PATENT DOCUMENTS

| | | | |
|---|---|---|---|
| 3,222,422 | 12/1965 | Cohen | 260/876 R |
| 3,851,014 | 11/1974 | Dalton | 260/876 R |

Primary Examiner—Carman J. Seccuro
Attorney, Agent, or Firm—Paul H. Ginsburg

[57] ABSTRACT

Disclosed is a novel polybutadiene or butadiene-styrene copolymer based gum plastic having excellent impact strength and weather aging resistance and a method for its preparation. The ABS composition of the invention is a matrix of a polymer of at least one monoethylenically unsaturated monomer and a graft copolymer comprising a graftable rubber substrate which is formed from a mixture of an at least partially cross-linked pre-grafted polybutadiene or SBR spine latex, and a low-gel elastomer which has been at least partially cross-linked during the preparation of the product. Within certain ratios of cross-linked spine to low-gel spine, significant improvements in impact strength and weather aging resistance are achieved. In the method of preparation, the latex, monomers and low-gel elastomer, are converted directly to the final product by a conventional suspension polymerization process.

14 Claims, No Drawings

ABS COMPOSITION HAVING IMPROVED IMPACT STRENGTH AND WEATHER AGING RESISTANCE AND LATEX SUSPENSION PROCESS THEREFOR

CROSS REFERENCE TO RELATED APPLICATIONS

This is a division of application Ser. No. 560,783, filed Mar. 21, 1975 now U.S. Pat. No. 4,107,234.

This application is related to, and incorporates by reference, application Ser. No. 560,988, now U.S. Pat. No. 4,042,647, entitled LATEX SUSPENSION PROCESS AND COMPOSITION USING SMALL PARTICLE SIZE SPINE of Robert J. Cornell, which application is being filed concurrently herewith.

BACKGROUND OF THE INVENTION

1. Field of the Invention

The invention relates to novel compositions, and in particular, to tough, impact and weather aging resistant ABS polymers and process therefor.

2. Description of the Prior Art

In the last several years, numerous U.S. and foreign patents have issued involving latex suspension processes. None of these patents, which are described below suggests the unexpectedly excellent properties obtained by using a low-gel elastomer together with a cross-linked latex spine graft in the latex-suspension processes. Small particle size spine, hereinafter referred to as "SPS spine" as used herein is meant to signify a spine prepared by conventional techniques, and consisting of rubber particles from 0.02–0.14μ in diameter with at least 60% less than 0.07μ in diameter, and large particle size spine, hereinafter referred to as "LPS spine" as used herein is meant to signify a spine prepared by conventional techniques, and consisting of rubber particles from about 0.05 to about 1.0μ.

British Pat. No. 1,299,268 discloses a process wherein an 80/20 spine/resin graft latex is added to styrene and acrylonitrile monomers, the latex is coagulated and the water phase is separated. The resulting cement of monomers soaked up in the graft is polymerized in bulk. The reference discloses that polymerization may also be performed using suspension techniques.

In U.S. Pat. No. 3,751,526 there is described a process, involving the addition of a spine latex to monomers followed by coagulation and separation of the water phase. The polymerization is run in bulk. No disclosure at all is made of the use of either an 80/20 spine/resin graft latex or the ability to carry out the polymerization using suspension techniques.

U.S. Pat. No. 3,637,555 merely discloses new stabilizer systems for ABS, but in the disclosure there is cross-reference to a copending application, Ser. No. 748,656, involving the use of an 80/20 spine/resin graft latex in a latex-suspension process. Counterparts of this co-pending application have been issued in Canada Pat. No. (877,378), Britain Pat. No. (1,253,242) and France Pat. No. (2,014,012).

In British Pat. No. 1,253,242 a latex-suspension process somewhat similar to the present latex-suspension process is disclosed. The process involves addition of monomers and a graft latex to a suspending solution.

In British Pat. No. 1,315,513 the latex-suspension process is the same as described in British Pat. No. 1,253,242 except that the monomer system is styrene and methyl methacrylate.

Japanese Pat. No. 47/47864 describes a process wherein styrene/acrylonitrile monomers are bulk polymerized to 1–45% monomer conversion, after which a spine or a graft latex is added to the bulk polymerized monomers and the mixture is suspended, followed by the addition of a second portion of spine or graft latex and finally, by polymerization of the entire mass to form beads. If the bulk polymerization step is run to 1% conversion by bulk polymerization and the latex added after the addition of the suspending solution, the final process is almost identical to the process described in British Pat. No. 1,253,242.

French Pat. No. 2,148,171 describes a process similar to British Pat. No. 1,253,242 except for the use of spine latex in place of graft latex.

U.S. Pat. No. 3,370,105 describes a latex-suspension process which involves addition of spine latex to monomers, complete coagulation of the latex and vigorous agitation to obtain the desired particle size in the suspension stage. Polymerization is initiated after coagulation in this process.

In Japanese Pat. No. 48/05870 there is described a latex-suspension process which involves adding a spine latex to monomers, coagulation in the presence of an acid followed by the addition of base and suspending solution.

The preparation of tough, impact resistant plastics by the grafting of resin-forming monomers onto elastomeric spines is well known. Examples of such materials which are prepared commercially are high impact polystyrene and ABS polymers. The latter materials, for example, are graft copolymers of styrene and acrylonitrile on butadiene elastomers such as SBR (styrene-butadiene rubber) or polybutadiene. More precisely, the ABS polymers are comprised of (1) a continuous phase consisting essentially of styrene acrylonitrile copolymer, and (2) a disperse phase consisting essentially of butadiene (or SBR) elastomer uniformly dispersed throughout the continuous phase. The graft copolymer provides cohesiveness to the system by overcoming the incompatability of the resin and the elastomer with each other.

ABS polymers have been prepared for many years by carrying out the polymerization by an aqueous emulsion process (U.S. Pat. No. 2,802,808; U.S. Pat. No. 2,820,773 and U.S. Pat. No. 2,994,683). In these processes, the rubber latex is grafted with a copolymer of styrene and acrylonitrile with the simultaneous in situ, formation of ungrafted styrene-acrylonitrile copolymer. Adjustment to the desired rubber level for specific properties is made either in the initial recipe or by the addition of varying amounts of free styrene-acrylonitrile emulsion latex. The resulting latex is then flocced, dried and compounded according to well known techniques.

SUMMARY OF THE INVENTION

The invention provides products and processes.

The product according to the invention is, in its broadest aspect, a composition which is essentially a polyblend of (a) a matrix of a polymer of at least one monoethylenically unsaturated monomer and (b) a graft copolymer comprising a graftable rubber substrate which is formed from a mixture of (1) a crosslinked pre-grafted polybutadiene or SBR rubber spine latex and (2) a low-gel elastomer; and grafted onto the substrate, a superstrate which is a polymer of at least one monoethylenically unsaturated monomer.

The matrix is a polymer of a monoethylenically unsaturated monomer or a copolymer of two or more such monomers.

Among these monomers there are included monovinylidenic aromatic hydrocarbons such as styrene, α-methylstyrene and substituted styrenes such as o-methylstyrene, m-methylstyrene, p-methylstyrene, o,m,p-ethylstyrenes, 2,5-dichlorostyrene, o,p-dimethylstyrene; alkenoic acids such as acrylic acid and methacrylic acid, alkenoic esters such as methyl acrylate, ethyl acrylate, butyl acrylate, methyl methacrylate, ethyl methacrylate and butyl methacrylate, alkenoic nitriles such as acrylonitrile and methacrylonitrile; vinyl esters such as vinyl acetate and vinyl propionate; vinyl ethers such as ethyl vinyl ether; vinyl chloride; vinyl pyridine; methyl vinyl pyridine and esters of maleic and furmaric acids.

Preferably, the matrix will be a copolymer of a monovinylidenic aromatic hydrocarbon and an alkenoic (monoethylenically unsaturated) nitrile, in a ratio of about 60-80% of hydrocarbon and 20-40% of nitrile, preferably about 70% hydrocarbon and 30% nitrile. The most preferred copolymer for the matrix is a 70/30 copolymer of styrene and acrylonitrile.

The graft copolymer with which the matrix is blended comprises a substrate which is formed from a mixture of a crosslinked pre-grafted polybutadiene or SBR rubber spine (small particle size SPS; or large particle size - LPS) latex and a low-gel elastomer and grafted onto said substrate, a superstrate which is a polymer which may or may not be of the same type as the matrix.

The latex spine is an SPS or LPS butadiene or SBR rubber containing from 0 to 31%, preferably, 0-15% and most preferably, 0-10% of styrene and from 69-100%, preferably, 85-100% and most preferably, 90-100% of butadiene, said latex spine being 50-98%, preferably 80-90% cross-linked. The particle size of the crosslinked grafted spine may vary from that of an SPS spine, to that of an LPS spine or a mixture of SPS and LPS spines.

The low-gel elastomers which may be used in accordance with the invention broadly include any unvulcanized natural or synthetic rubber. As used herein, the term "low-gel elastomer" means an elastomer which contains less than about 10% gel, the gel being that portion of the elastomer that is insoluble upon dissolution in a suitable solvent. This portion may be rendered insoluble by virtue of cross-linking. A suitable solvent is one which closely matches the polarity and hydrogen bonding characteristics of the elastomer. A typical test for the determination of gel content of 95/5 butadiene/styrene rubber is to cut about 0.25 gm. of the sample into small pieces (~2 mm. square) which are placed on several layers of metal screens immersed in 100 ml. of benzene or toluene. The system is sealed and allowed to stand at room temperature for 48 hours, at which time an aliquot of the decanted liquid is withdrawn with a pipet and analyzed for solid content. Different solvents are preferred for different materials; for example the gel content in acrylonitrile butadiene rubber would be determined by dissolution in more polar solvents such as methyl ethyl ketone or dimethylformamide. The rubber should preferably have a Mooney viscosity of from about 20 to 120 at 212° F. (ML-4; ASTM D-927-55T). Examples of such suitable rubbers are natural rubber, synthetic SBR (styrene-butadiene) type rubbers which are copolymers of from 0 to 31% by weight of styrene and from 69 to 100% by weight of butadiene, preferably, 0-10% of styrene and 90-100% of butadiene. Obviously, when the styrene content is 0%, the rubber is polybutadiene. The most preferred SBR rubber is one in which styrene comprises 5% and butadiene comprises 95%.

Also included are synthetic NBR (nitrile) type rubbers which are copolymers of from 50 to 85% of butadiene and 15 to 50% of acrylonitrile, preferably, 60-85% of butadiene and 15-40% of acrylonitrile. The most preferred NBR rubber is one in which butadiene comprises 67.5% and acrylonitrile comprises 32.5%.

The low-gel elastomer may also be a copolymer of 50% by weight of butadiene and 50% methyl isopropenyl ketone, polypentenamer, polyisoprene, natural rubber, polyacrylate rubbers, butyl rubber, EPDM, copolymers of butadiene and butyl acrylate, or copolymers of butadiene and isoprene.

The superstrate which is grafted onto the substrate, and which may be the same polymer which forms the matrix, is, in the most preferred embodiment, a styrene/acrylonitrile (SAN) copolymer of about 60-80%, preferably 70% styrene and about 20-40%, preferably 30% acrylonitrile.

Generally, the ratio of the total amount of SAN, including the ungrafted SAN forming the matrix and the grafted SAN forming the superstrate to the spine varies in the range of from about 95/5 to 55/45, preferably about 91/9 to 82/18. The degree of grafting of the superstrate to the substrate, defined as the ratio of the weight of the grafted SAN to the weight of the spine, generally varies from about 0.2 to 1.0, preferably 0.4 to 0.8.

According to the process of the invention, the novel polybutadiene or butadiene-styrene copolymer based gum plastic composition is prepared via a latex-suspension process, starting with a cross-linked pre-grafted SBR rubber spine latex, one or more monoethylenically unsaturated monomers and a low-gel elastomer. This latex-suspension process is more desirable from an economic standpoint than the standard emulsion process because it eliminates the costly floccing step which is necessary in the emulsion techniques. The floccing of an emulsion latex results in extremely high level of pollutants and treating of these effluents adds considerably to the overall manufacturing costs of the product. Unexpectedly, it has been found that the use of a low-gel elastomer, together with a cross-linked pre-grafted SBR rubber spine latex and one or more monoethylenically unsaturated monomers in a latex-suspension process leads to ABS polymers exhibiting improved impact strength and weather aging resistance. In contrast, polymerization of these materials using a standard emulsion polymerization technique results in a material having poor impact strength and poor weather aging resistance.

In performing the process, a prepolymerization mass is first prepared by dissolving the low-gel elastomer in the monomers, after which the cross-linked pre-grafted SBR rubber spine latex is added. An antioxidant system, a chain transfer agent, an initiator and a gelling agent for the low-gel elastomer are then added. A suspending solution is added to the pre-polymerization mass and suspension polymerization is run to completion. Two variations of the above-described process are possible without effecting the overall properties of the obtained ABS polymer. In one variation, the low-gel elastomer can be added in latex form in the same manner as the cross-linked pre-grafted spine latex is added. In the other, although not the preferred variation, the cross-linked pre-grafted spine can be added in powder form along with the low-gel elastomer to the monomers followed by suspension in the suspending solution.

The suspension polymerization reaction can be initiated thermally, or in the preferred embodiment, with an initiator, such as a peroxide or an azo initiator, for example, diacryl peroxides such as benzoyl peroxide, aliphatic diacyl peroxides such as lauroyl peroxide, alkyl peroxy esters such as t-butyl peroxypivalate, t-butyl peroctoate, t-butyl perbenzoate, t-butylperoxyneodecanoate or alkylperoxides such as di-t-butyl peroxide. Azo initiators such as azo-bis-isobutyronitrile can also be used. Various combinations of these initiators may also be used.

Specific catalyst systems (initiators) which have been found to be particularly effective for producing the ABS polymers of the invention are t-butyl peroxypivalate or a mixture thereof with lauroyl peroxide. Other catalysts which have been found to be suitable are lauroyl peroxide, benzoyl peroxide and azo-bis-isobutyronitrile.

The amount of initiator to be used in the suspension polymerization is generally from about 0.1 to about 0.5% by weight based on the weight of the pre-polymerization mass when a single initiator is used, and from 0.05 to 0.25% by weight of each initiator when a mixture of two or more such initiators is used. Preferably, 0.2–0.3% by weight of a single initiator is used and 0.2% by weight of each are used, when a mixture of initiators is employed.

The antioxidant system may be a hindered phenol such as Naugawhite® in an amount of 0.01 to 1.2%, either alone, or in combination with ditridecyl thiodipropionate (DTDTDP) in an amount of 0.1 to 3% by weight based on the weight of the pre-polymerization mass. Other phenolic antioxidants which may be used include, for example, 2,2'-methylenebis-(4-ethyl-6-t-butylphenol); 2,6-di-t-butyl-4-methylphenol; and 4,4'-thiobis-(2,6-di-t-butylphenol). Also, an alkaryl phosphite such as tris-nonylphenyl phosphite or an alkyl phosphite (Weston-618) may be used as the antioxidant.

The chain transfer agent may be any of those materials generally used for such purpose, for example, 0.01–1.0% of a mercaptan such as t-dodecyl mercaptan. A preferred chain transfer agent is 0.01–1.0% of a mixture of mercaptans, known as mixed tertiary mercaptans (MTM) consisting of 60% dodecyl-, 20% tetradecyl- and 20% hexadecyl-mercaptans.

The gelling (or cross-linking) agent, which is added for the purpose of partially cross-linking the low-gel elastomer in the latter stages of the suspension polymerization, or during compounding of the product after polymerization, is such that it only becomes activated at relatively high temperatures to which the polymer is subjected during compounding or at the end of the polymerization procedure when the temperature has increased substantially. Examples of such gelling agents are peroxides such as dicumyl peroxide, di-t-butyl peroxide, t-butyl perbenzoate, t-butyl peroxy isopropyl carbonate, 2,2-bis-(t-butyl-peroxy)-diisopropylbenzene, 2,5-dimethyl-2,5-di-(t-butylperoxy)-hexane and 2,5-dimethyl-2,5-di-(t-butylperoxy)-hexyne-3.

To the pre-polymerization mass, including the initiator, antioxidant, gelling agent and chain transfer agent, the suspending solution is then added. Alternatively, the pre-polymerization mass can be added to the suspending solution.

The suspending solution is an aqueous solution of a suspending or dispersing agent and can be any one or more of a variety of water soluble dispersing agents known to the art, such as alkali salts of sulfonated polystyrene, sulfonated polyvinyl toluene, polyacrylic acid, polyacrylamide, methyl celluslose, hydroxyethyl cellulose, interpolymers of acrylic or methacrylic acid with 2-ethyl hexylmethacrylate, carboxymethyl methyl cellulose, and polyvinyl alcohol. The use of alkali salts, such as sodium chloride, $EDTA.Na_x$ ($x=1-3$) and Sulframin 45s (40% sodium n-dodecylbenzene sulfonate, 5% sodium xylenesulfonate and 55% water) can be used alone or in combination with the above dispersing agents to improve suspension stability.

A preferred suspending system contains hydroxyethyl cellulose (Natrosol 250HR sold by Hercules) and ethylenediamine tetra-acetic acid -tri sodium salt ($EDTA.Na_3$). The mixture can be used in amounts corresponding to from 0.2 to 2.0 parts of Natrosol 250HR and 0.06 to 0.6 part $EDTA.Na_3$ per hundred parts of polymer. The preferred range is from 0.45 to 0.90 part Natrosol 250HR and 0.15 to 0.30 part $EDTA.Na_3$. Another preferred suspending system based on polyvinyl alcohol (PVA) contains 0.1 to 0.4 part of PVA (Elvanol 50-42; du Pont), 0.08 to 0.32 part NaCl and 0.06 to 0.24 part Sulframin 45s. In general, an amount of the aqueous solution corresponding to from 1 to 3 times the weight of the polymer is employed.

Generally, it is desirable, although not essential to add a lubricant to the pre-polymerization mass in order to improve the flow and moldability of the composition. Suitable lubricants include, e.g., refined mineral oils, mixtures of paraffin wax and hydrocarbon oil, or ester lubricants such as butyl stearate, generally in amounts of 1-6, preferably, 3 parts per hundred parts of polymer. A preferred lubricant is an aromatic oil such as Sunthene 250 (Sun Oil Co.).

The suspension polymerization is then run to completion for about 20 hours at about 105°–250° F. in the absence of air or oxygen.

The substantially completely polymerized beads are separated from the suspension medium by any of the conventional methods, such as screening, sedimentation or centrifuging. They are then dried, extruded, pelletized, and packaged.

The level of total rubber in the product may range from about 5% to about 45% by weight. Those polyblends containing high rubber levels can be blended back with, for example, a styrene/acrylonitrile, or other resin such as α-methylstyrene/acrylonitrile to reduce the final rubber level to a preferred level between 9 and 18% by weight. The remaining polymer consists of SAN copolymer, both free and grafted.

In one of the tests conducted on the products of the following examples, specifically the accelerated aging test which is used to determine the weather aging resistance of the products, they are subjected to accelerated aging in the presence of from 0.1–3, preferably, 0.25–1.0 parts by weight of at least one ultraviolet (UV) stabilizer.

These UV stabilizers are conventional and among those that can be used, there are included benzotriazole type stabilizers such as Tinuvin P and Tinuvin 327 (Ciba-Geigy); benzophenone type stabilizers such as Cyasorb U.V. 9 and Cyasorb U.V. 531 (American Cyanamid); nickel organic type stabilizers such as Cyasorb U.V. 1084 (American Cyanamid); benzylidene malonate type stabilizers such as Cyasorb U.V. 1988 (American Cyanamid); phosphonate type stabilizers such as Busorb 34 (Backman Laboratories) and benzoate ester type stabilizers such as AM-340 (Ferro Chemical).

DESCRIPTION OF THE PREFERRED EMBODIMENTS

The following examples, taken together with the drawings, to which reference is herein made, are given to illustrate the invention without, however, limiting the scope thereof. Unless otherwise indicated, all parts given are by weight.

EXAMPLE 1

This example describes the preparation of an 80/20 graft of a large particle size (LPS) rubber spine/styrene-acrylonitrile (SAN) copolymer, which graft is used as one of the starting ingredients in several of the subsequent examples.

| RECIPE FOR 80/20 LPS SPINE/SAN | |
|---|---|
| Material | Amount |
| Water | 180 |
| LPS Spine (1) | 80 |
| Styrene | 14 |
| Acrylonitrile | 6 |
| Dresinate 731 (2) | 2.0 |
| NaOH | 0.05 |
| $K_2S_2O_8$ | 0.3 |

(1) A styrene-butadiene (7/93) latex spine, prepared in accordance with the procedure described in "Synthetic Rubber", Whitby (1954); Emulsion Polymerization Systems ch. 8 (C. F. Fyling), page 228 but modified as follows: 2.2 parts of soap used instead of 5.0 parts and polymerization ran to 95% conversion.
(2) Emulsifying agent consisting of a sodium soap of a modified resin (abietic acid) derived from tree rosin; Hercules, Inc.

EXAMPLE 2

This example describes the preparation of an 80/20 graft of a small particle size (SPS) rubber spine/styrene-acrylonitrile (SAN) copolymer, which graft is used as one of the starting ingredients in several of the subsequent examples.

| RECIPE FOR SPS SPINE/SAN | |
|---|---|
| Material | Amount |
| Water | 180 |
| SPS Spine (1) | 80 |
| Styrene | 14 |
| Acrylonitrile | 6 |
| Dresinate 731 (2) | 2.0 |
| NaOH | 0.05 |
| $K_2S_2O_8$ | 0.3 |

(1) A styrene-butadiene 7/93 latex spine prepared in accordance with the procedure described in "Synthetic Rubber", Whitby (1954); Emulsion Polymerization Systems, ch. 8 (C. F. Fyling), page 228 except that polymerization was run to 95% conversion.
(2) See footnote (2), Example 1.

EXPERIMENTAL PROCEDURE FOR EXAMPLES 1 AND 2

The experimental procedure for both Examples 1 and 2 is the same and is as follows:

The latex spine (either the LPS spine or the SPS spine) was weighed out and placed in a reactor which was blanketed with nitrogen while agitating the reactor. A soap solution was made from 140 ml. of the water, the Dresinate 731 and the sodium hydroxide with slight warming to dissolve the soap. 42.5 gms. of the solution were added to the reactor and the remainder of the solution was placed in a dropping funnel. The monomers (styrene and acrylonitrile) were weighed out and placed into a second dropping funnel. The $K_2S_2O_8$ was added to the remaining 40 ml. of water and the solution was added to the reactor when the temperature reached 150° F. The monomers and the soap solution were added dropwise into the reactor over a period of 1.5–2 hours. The mixture was allowed to react overnight with stirring, after which the percent solids was determined to ascertain the extent of conversion.

EXAMPLES 3–7

These examples describe the preparation, via the latex suspension technique of the invention of ABS compositions including a low-gel elastomer, an 80/20 LPS spine/SAN latex graft and ethylenically unsaturated monomers, i.e., styrene and acrylonitrile.

The recipe and procedure for Example 3 (Table 1) are given below.

TABLE 1

| RECIPE FOR LATEX SUSPENSION RUN | | |
|---|---|---|
| Material | Amount | |
| Synpol 8107E (1) | 2.8 | gm. |
| LPS Spine/SAN Latex (80/20) (2) | 14.0 | gm. (based on solids) |
| Styrene | 58.4 | gm. |
| Acrylonitrile | 24.8 | gm. |
| Sunthene 250 Oil (3) | 3.0 | gm. |
| Dicumyl peroxide | 0.03 | gm. |
| Mixed tertiary mercaptans | 0.45 | gm. |
| t-butyl peroxypivalate | 0.20 | gm. |
| Di-tridecylthiodipropionate | 1.20 | gm. |
| Naugawhite ® 0.40 | gm. | |
| 0.6% suspending solution: [0.45% Natrosol 250HR and 0.15% EDTA, Na₃] (5) | 200.00 | gm. |

(1) Synpol 8107E - A low-gel SBR elastomer, comprising 95% butadiene and 5% stryene, commercially available from Texas, U.S. Chemical Co., Port Neches, Texas.
(2) LPS Spine/SAN latex - cross-linked graft consisting of 80% elastomer (93 butadiene/7 styrene), 20% grafted and free resin (71/29:styrene/acrylonitrile) Example 1, or U.S. Pat. 2,820,773.
(3) Aromatic oil (Sun Oil Co.)
(4) A hindered phenol (Uniroyal, Inc.)
(5) Natrosol 250HR is Hercules, Inc. brand of hydroxyethylcellulose. EDTA.Na₃ is the trisodium salt of EDTA.

PROCEDURE

The low-gel elastomer (Synpol 8107E) was dissolved in the styrene, acrylonitrile and the Sunthene 250 Oil to form a cement. The cement was charged to a resin pot after which the LPS spine/SAN graft latex was added to the cement and stirred to obtain a uniform mixture. During this mixing period, the cross-linking agent (dicumyl peroxide), the chain transfer agent (mixed tertiary mercaptans [60% dodecyl-, 20% tetradecyl- and 20% hexadecylmercaptans]), ditridecylthiodipropionate, Naugawhite® and the initiator (t-butyl peroxypivalate) were added. These materials can also be added prior to the addition of the latex, if desired, without affecting the process.

To the resulting mixture, under an inert atmosphere, the suspending solution was added. Fine uniform dispersion of the materials occurs using medium speed for agitation. Alternatively, addition of the pre-polymerization mass consisting of monomers, graft latex and low-gel rubber to the suspending solution may also be effected without altering the final properties of the product. The polymerization is run for 20 hours at 150°–185° F., after which the resulting beads were removed by filtration, washed with distilled water, and air dried at 165° F. for 24 hours. The beads were compounded using conventional procedures involving heating the beads in a 350° F. press for five minutes to gel the rubber, followed by milling at 320° F. for 10 to 15 minutes. Test specimens were compression molded at 350° F. The properties of the product are set forth in Table 3.

The procedures followed in Examples 4–7 were the same as given above for Example 3, the differences being in the recipes for each of Examples 4–7. Table 2 sets forth the recipes for Examples 4–7 as well as repeating that of Example 3.

TABLE 2
ABS CONTAINING LPS GRAFTED SPINE AND SYNPOL 8107E (LOW-GEL ELASTOMER)

| Recipe | 3 | 4 | 5 | 6 | 7 |
|---|---|---|---|---|---|
| Ratio LPS Spine/SAN/Synpol 8107E (3) | 80/20 | 60/40 | 35/65 | 30/70 | 95/5 |
| (80/20) LPS Spine/SAN latex | 14 | 11.25 | | 5.2 | 15.5 |
| (50/50) LPS Spine/SAN latex | | | 11.2 | | |
| Synpol 8107E | 2.8 | 6 | 10.4 | 9.8 | 0.65 |
| Styrene | 58.4 | 57.9 | 53.2 | 59.5 | 56.3 |
| Acrylonitrile | 24.8 | 24.8 | 25.2 | 25.5 | 27.55 |
| Sunthene 250 | 3 | 0 | 0 | 3 | 3 |
| Acetic acid | sodium 0.3 | 0.2 | 0 | 0 | |
| Dicumyl peroxide | 0.03 | 0.05 | 0.06 | 0.08 | 0.02 |
| Mixed tertiary mercaptans | 0.45 | 0.21 | 0.26 | 0.45 | 0.5 |
| t-butyl peroxypivalate | 0.2 | 0.18 | 0.22 | 0.2 | 0.3 |
| Lauroyl peroxide | 0.0 | 0.09 | 0.0 | 0.0 | 0 |
| Di-tridecylthiodipropionate | 1.2 | 1.2 | 0.75 | 1.2 | 1.2 |
| Naugawhite® | 0.4 | 0.4 | 0.25 | 0.4 | 0.4 |
| Suspending Solution | | | | | |
| 0.6% [Natrosol 250HR/EDTA.Na$_3$:3/1] | 200 | | | 200 | 200 |
| 0.36% [0.15% Elvanol 50–42(1)0.12% NaCl and 0.09% Sulframin 45s (2)] | | 200 | 200 | | |

(1) Elvanol 50–42 - Polyvinyl alcohol 87–89% hydrolyzed - du Pont.
(2) Sulframin 45s - 40% sodium n-dodecylbenzene sulfonate, 5% sodium xylenesulfonate and 55% water.
(3) All such ratios in this and subsequent examples and text are based on the percentage of the total rubber contributed by the LDS (or SPS) spine/SAN graft versus the low gel elastomer.

Each of Examples 4–7 was run in the same manner as Example 3. In Examples 4 and 5, 0.3 and 0.2 part of acetic acid per 100 parts of total polymer was added to the recipe for controlling the rate of polymerization.

As can be seen from Table 2, the ratio of LPS spine/SAN graft to low-gel elastomer was varied from as high as 95/5 (Example 7) to as low as 30/70 (Example 6) in order to permit a determination of the range of ratios at which improved weather aging will be achieved.

The properties of the products of Examples 3–7 as well as those of Comparative Examples I–III are set forth below in Table 3.

COMPARATIVE EXAMPLE I

This example describes the preparation of an ABS containing LPS grafted spine and a low-gel elastomer which is quite similar to Example 4 except for the fact that the polymerization was run using standard emulsion polymerization techniques. The purpose of this comparative example is to show the significance of the process by which the composition is prepared, as well as the significance of the product itself. The procedure used was that of Example 1 for the preparation of the 80/20 LPS spine/SAN graft latex. The recipe used in this preparation is as follows:

| Material | Amount | |
|---|---|---|
| Water | 120 | gm. |
| (80/20) LPS spine/SAN latex | 11.25 | gm. (solids) |
| Synpol 8107 latex | 6.0 | gm. (solids) |
| Styrene | 57.9 | gm. |
| Acrylonitrile | 24.8 | gm. |
| Dicumyl peroxide | 0.05 | gm. |
| Mixed tertiary mercaptans | 0.40 | gm. |
| Dresinate 731 | 2.6 | gm. |
| NaOH | 0.078 | gm. |
| $K_2S_2O_8$ | 0.6 | gm. |

The obtained latex was flocced in 2% $MgSO_4$ solution at 200°–205° F., filtered, washed and dried at 150° F. overnight.

COMPARATIVE EXAMPLE II

This example compares the properties of a well-known, commercially available extrusion grade ABS (1) having excellent physical properties and which is prepared by standard emulsion polymerization techniques, without, however, using any low-gel elastomer.
(1) Kralastic® SRS - Extrusion grade ABS from Uniroyal Chemical; Division of Uniroyal, Inc.

COMPARATIVE EXAMPLE III

This example describes the preparation of an ABS containing LPS grafted spine which is similar to Example 7, but without any low-gel elastomer. The procedure was the same as that of Example 3. The recipe used is as follows:

| Material | Amount |
| --- | --- |
| Ratio LPS Spine/SAN//Synpol 8107E | 100/0 |
| (80/20) LPS Spine/SAN latex | 16.3 (solids) |
| Synpol 8107E | 0 |
| Styrene | 56.7 |
| Acrylonitrile | 27.7 |
| Sunthene 250 | 3 |
| Acetic acid | 0 |
| Dicumyl peroxide | 0 |
| Mixed tertiary mercaptans | 0.4 |
| t-butyl peroxypivalate | 0.3 |
| Di-tridecylthiodipropinate | 1.2 |
| Naugawhite ® | 0.4 |
| 6% [Natrosol 250HR/EDTA.Na₃: 3/1] | 200 |

Samples of the products of Examples 3-7 and Comparative Examples I, II and III, each containing 1 part per hundred by weight of Tinuvin P, a benzotriazole type UV stabilizer were subjected to accelerated aging in an accelerated aging unit. American Ultraviolet Co., model 10×10×24FS/BL, using Westinghouse FS20T12 fluorescent sun lamps and F20T12BL fluorescent black lights. The chip impact strength (1) of the samples subjected to aging was determined periodically. The tests results are set forth in Table 3.

(1) Chip Impact Strength is determined using a modified ASTM D-256 test; chip impact strength values are determined on a test specimen 0.5×0.5×0.100 inch, clamped in a vise set in the standard Izod tester (ASTM D-256) and struck with a hammer from 0.218 inch above the vise, the values being expressed in inch pounds per square inch. Because it is easier to measure and correct for minor variations in the sample width and sample thickness than to adjust the position of the sample holder, the impact value is computed as:

$$\text{Chip Impact} = \frac{\text{(inch-lbs. reading on test scale)}}{\text{(sample width)} \times \text{(sample thickness) in inches}}$$

TABLE 3

| Sample | Ratio of LPS Spine/SAN Graft to Low-gel Elastomer | TIME (HRS) Chip Impact Strength in.-lb./in. | | | | | |
| --- | --- | --- | --- | --- | --- | --- | --- |
| | | 0 | 50 | 100 | 250 | 500 | 1000 |
| Example 3 | 80/20 | 185 | 101 | 100 | 96 | 100 | 101 |
| Example 4 | 60/40 | 200 | 128 | 126 | 123 | 120 | 118 |
| Example 5 | 35/65 | 190 | 137 | 123 | 110 | 115 | 123 |
| Example 6 | 30/70 | 158 | 131 | 105 | 106 | 115 | 15 |
| Example 7 | 95/5 | 180 | 94 | 83 | 92 | 103 | 73 |
| Comparative Example I | 60/40 | 18 | 8 | 9 | 6.9 | — | — |
| Comparative Example II | 100/0 | 174 | 92 | 81 | 79 | 83 | 82 |
| Comparative Example III | 100.0 | 183 | 92 | 85 | 84 | 95 | 77 |

These data are graphically shown in FIG. 1. As can be seen therefrom, the chip impact strength of all the samples, ranging from an 100/0 ratio of LPS spine/SAN graft to low-gel elastomer to a 30/70 ratio remained relatively constant after 250 hours of aging in the FS/BL unit. The chip impact strength at 250 hours is a good indication of impact improvement with respect to weather aging. The best chip impact strength after 250 hours of aging was shown by the product of Example 4, i.e., the sample wherein the ratio of LPS spine/SAN graft to low-gel elastomer is 60/40. While this peaking occurs with a 60/40 ratio, the result is not due to this factor alone. Thus, the product of Comparative Example I, in which the LPS spine/SAN graft and low-gel elastomer are also present in a 60/40 ratio does not possess the excellent properties of the compositions according to the invention and which are made by the latex suspension process of the invention. After 250 hours of aging, the chip impact strength of this product had dropped to only 6.9.

EXAMPLES 8-12 and COMPARATIVE EXAMPLE IV

These examples (8-12) describe the preparation, via the latex suspension technique of the invention of ABS compositions including a low-gel elastomer, an 80/20 SPS spine/SAN latex graft and ethylenically unsaturated monomers, i.e., styrene and acrylonitrile. Comparative Example IV is similar, but does not include a low-gel elastomer.

The recipes for Examples 8-12 and Comparative Example IV are given below in Table 4.

TABLE 4

ABS CONTAINING SPS GRAFTED SPINE AND LOW-GEL ELASTOMER (SYMBOL 8107E)

| Materials | AMOUNTS Example | | | | | |
| --- | --- | --- | --- | --- | --- | --- |
| | 8 | 9 | 10 | 11 | 12 | Comp.Ex. IV |
| Ratio SPS Spine/SAN to Synpol 8107E | 80/20 | 50/50 | 30/70 | 95/5 | 90/10 | 100/0 |
| SPS Spine/SAN latex (1) | 14 | 8.8 | 5.25 | 15.5 | 14.7 | 16.3 |
| Synpol 8107E | 2.8 | 7 | 9.8 | 0.65 | 1.3 | 0 |
| Styrene | 55.7 | 55.8 | 56.9 | 56.30 | 56.30 | 56.7 |
| Acrylonitrile | 27.5 | 28.4 | 28.0 | 27.55 | 27.7 | 27.7 |
| Sunthene 250 | 3 | 3 | 3 | 3 | 3 | 3 |
| Dicumyl peroxide | 0.03 | 0.03 | 0.08 | 0.02 | 0.02 | 0 |
| Mixed tertiary mercaptans | 0.45 | 0.45 | 0.45 | 0.5 | 0.5 | 0.4 |
| t-butyl peroxypivalate | 0.2 | 0.2 | 0.2 | 0.3 | 0.3 | 0.3 |
| Di-tridecylthiodipropionate | 1.2 | 1.2 | 1.2 | 1.2 | 1.2 | 1.2 |
| Naugawhite R | 0.4 | 0.4 | 0.4 | 0.4 | 0.4 | 0.4 |

TABLE 4-continued
ABS CONTAINING SPS GRAFTED SPINE AND LOW-GEL ELASTOMER (SYMBOL 8107E)

| | AMOUNTS Example | | | | | |
|---|---|---|---|---|---|---|
| Materials | 8 | 9 | 10 | 11 | 12 | Comp.Ex. IV |
| 0.6% [Natrosol 250HR/EDTA.N$_3$:3/1] | 200 | 200 | 200 | 200 | 200 | 200 |

(1) An 80/20 SPS spine/SAN latex graft prepared in accordance with Example 2.

The experimental procedure followed in each of Examples 8–12 and Comparative Example IV was the same as that described above in Example 3.

Samples of the products of Examples 8–12 and Comparative Example IV, each containing 1 part per hundred by weight of Tinuvin P, a benzotriazole type UV stabilizer were subjected to accelerated aging as described above. The chip impact strength of the samples subjected to aging was determined periodically. The tests results are set forth in Table 5.

TABLE 5

| SAMPLE | RATIO OF SPS SPINE SAN GRAFT TO LOW-GEL ELASTOMER | CHIP IMPACT STRENGTH TIME (HRS) | | | | | |
|---|---|---|---|---|---|---|---|
| | | 0 | 50 | 100 | 250 | 500 | 1000 |
| Example 8 | 80/20 | 188 | 160 | 135 | 114 | 117 | 120 |
| Example 9 | 50/50 | 181 | 112 | 114 | 108 | — | — |
| Example 10 | 30/70 | 165 | 120 | 103 | 86 | 86 | 91 |
| Example 11 | 95/5 | 188 | 111 | 106 | 90 | 101 | 82 |
| Example 12 | 90/10 | 197 | 125 | 124 | 111 | 130 | 98 |
| Comparative Example IV | 100/0 | 109 | 21 | 29 | 39 | 58 | 41 |

The chip impact strength of the samples, ranging from an 100/0 ratio of SPS spine/SAN graft to low-gel elastomer to a 30/70 ratio, remained relatively constant after 250 hours of aging in the FS/BL unit. The chip impact strength at 250 hours is a good indication of impact improvement with respect to weather aging. The best chip impact strength after 250 hours of aging was shown by the products of Examples 8 and 12, i.e., the samples wherein the ratio of SPS spine/SAN graft to low-gel elastomer is 90/10 to 80/20. This contrasts with the results using an LPS spine where the maximum improvement in weather aging was observed at a 60/40 ratio of spine to low-gel elastomer. However, even at a ratio of 30/70 (Example 10), the weather aging resistance is superior to that of Comparative Example IV.

EXAMPLES 13–19

The preceding examples demonstrate the improved weather aging resistance of the ABS compositions of the invention using either grafted LPS or grafted SPS spines. It has also been found, in accordance with the invention that in the case of SPS spines, one can also achieve remarkable increases in impact strength within a certain range of ratios of SPS spine/SAN graft to low-gel elastomer.

In the following Examples 13–19 there is described a series of latex suspension polymerization runs, wherein the ratio of SPS spine/SAN graft to low-gel elastomer is varied between 30/70 and 100/0. As will be seen from the test data below, the greatest improvement in impact strength was obtained between the ratios of 50/50 and 95/5.

The recipes for each of Examples 13–19 are given below in Table 6. The procedure followed in these examples was that of Example 3.

TABLE 6

| MATERIAL | AMOUNTS EXAMPLE | | | | | | |
|---|---|---|---|---|---|---|---|
| | 13 | 14 | 15 | 16 | 17 | 18 | 19 |
| Ratio SPS Spine/SAN to Synpol 8107E | 30/70 | 50/50 | 60/40 | 70/30 | 90/10 | 100/0 | 95/5 |
| SPS Spine/SAN Graft (80/20) | 4.9 | 8.1 | 9.7 | 11.4 | 14.7 | 16.3 | 15.5 |
| Synpol 8107E | 9.1 | 6.5 | 5.2 | 3.9 | 1.3 | 0 | 0.65 |
| Styrene | 57.5 | 57 | 57 | 56.6 | 56.3 | 56 | 56.3 |
| Acrylonitrile | 28.5 | 28.4 | 28.1 | 28.1 | 27.7 | 27.7 | 27.5 |
| Sunthene 250 | 3 | 3 | 3 | 3 | 3 | 3 | 3 |
| Dicumyl peroxide | 0.10 | 0.05 | 0.05 | 0.05 | 0.02 | 0.025 | 0.02 |
| Ditridecylthiodipropionate | 1.2 | 1.2 | 1.2 | 1.2 | 1.2 | 1.2 | 1.2 |
| Naugawhite | 0.4 | 0.4 | 0.4 | 0.4 | 0.4 | 0.4 | 0.4 |
| t-butyl peroxypivalate | 0.3 | 0.3 | 0.3 | 0.3 | 0.3 | 0.3 | 0.3 |
| Mixed tertiary mercaptans | 0.4 | 0.4 | 0.4 | 0.4 | 0.5 | 0.4 | 0.5 |
| 0.48% [0.20% Elvanol 50-42, 0.16% NaCl, 0.12% Sulframin 45s] | 200 | 200 | 200 | 200 | | 200 | |
| 0.6% ]0.45% Natrosol 250HR, 0.15% EDTA.Na$_3$] | | | | | 200 | | 200 |

Samples of the products of Examples 13–19 were tested according to several well-known techniques to determine the properties thereof. The test results are set forth in Table 7.

TABLE 7

| TEST | TEST RESULTS EXAMPLE | | | | | | |
|---|---|---|---|---|---|---|---|
| | 13 | 14 | 15 | 16 | 17 | 18 | 19 |
| ⅛" NI (RT) ft. lbs./in. notch[1] | 5.7 | 6.1 | 8.0 | 8.6 | 7.8 | 2.7 | 6.8 |
| ⅛" NI (−20° F.) ft. lbs./in. notch[1] | 2.5 | 2.4 | 3.6 | 4.0 | 2.2 | 1.2 | 1.8 |
| Heat distortion temperature (°F.)[2] | | | | | | | |
| 264 psi | 208 | 208 | 201 | 203 | 205 | 205 | 204 |
| Hardness (Rockwell R)[3] | 100 | 107 | 104 | 109 | 103 | 105 | 102 |
| 350° F. Mooney Viscosity[4] | 53 | 60 | 60 | 69 | 78 | 70 | 54 |

[1]Notched Izod - Performed in accordance with the procedures described in ASTM D-256.
[2]Heat Distortion Temperature - Performed in accordance with the procedures described in ASTM D-684.
[3]Hardness (Rockwell R) - Performed in accordance with the procedures described in ASTM D-785.
[4]Mooney Viscosity - Performed in accordance with the procedures described in M. Mooney Ind. Eng. Chem. (Anal.Ed.) 6, 147 (1934) using a Mooney Viscosimeter, i.e., a rotational instrument which measures the torque required to revolve a rotor at constant speed in a sample of the polymer at constant temperature.

As can be seen from the data in Table 7, when as little as 5% of Synpol 8107E is added (Example 19) to the 80/20 SPS spine/SAN graft, the unaged impact strength shows a marked improvement from 2.7 ft. lbs. (Examples 18) to 6.8 ft. lbs. (Example 19).

Interestingly, when Example 19 was repeated using a standard emulsion polymerization technique, a polymer with a very low impact strength is obtained. Comparative Example V describes the preparation of such a product.

COMPARATIVE EXAMPLE V

The recipe for the preparation of this product was as follows:

| Material | Amount | |
|---|---|---|
| Water | 120 | gm. |
| SPS Spine/SAN graft (80/20) | 15.5 | gm. (solids) |
| Sunpol 8107E | 0.65 | gm. |
| Stryrene | 56.3 | gm. |
| Acrylonitrile | 27.5 | gm. |
| Sunthene 250 | 3 | gm. |
| Dicumyl peroxide | 0.02 | gm. |
| Dresinate 731 | 2.6 | gm. |
| NaOH | 0.078 | gm. |
| K₂S₂O₈ | 0.3 | gm. |
| Mixed tertiary mercaptans | 0.5 | gm. |

The procedure used in this example was the standard emulsion polymerization technique of Example 1 for the preparation of the 80/20 LPS spine/SAND graft latex. The obtained latex was flocced in 2% MgSO₄ solution at 200°–205° F., filtered, washed and dried at 150° F. overnight.

The properties of the obtained product are as follows:
⅛" NI (RT)=0.23 ft. lbs./in. notch
⅛" NI(−20° F.)=0.33 ft. lbs./in. notch
Hardness (Rockwell R)=115
Heat Distortion Temperature (°F.)=207
350° F. Mooney Viscosity=56

EXAMPLE 20

This example demonstrates the ability to carry out the suspension polymerization process using the LPS spine/SAN graft in powder form as well as in the latex form. The polymerization was carried out in a pilot plant 20 gallon reactor. The recipe for this example, which is similar to that of Example 4, is as follows:

| Material | Amount | |
|---|---|---|
| Synpol 8107E | 2.4 | lbs. |
| LPS spine/SAN (50/50) graft powder | 7.2 | lbs. |
| Styrene | 21.3 | lbs. |
| Acrylonitrile | 9.1 | lbs. |
| Mixed tertiary mercaptans | 39 | gms. |
| Dicumyl peroxide | 15.4 | gms. |
| t-butyl peroxypivalate | 32.6 | gms. |
| Lauroyl peroxide | 16.3 | gms. |
| Di-tridecylthiodipropionate | 116 | gms. |
| Naugawhite ® | 40 | gms. |
| 0.2% suspending solution [0.1% Elvanol 50–42, 0.08% NaCl and 0.02% Sulframin 45s] | 80 | lbs. |

PROCEDURE

The styrene, acrylonitrile and Synpol 8107E were charged to a 20 gallon reactor and stirred until all the Synpol 8107E had dissolved. The LPS spine/SAN graft powder was then added to the cement and stirred until a uniform mixture was obtained. The mixed tertiary mercaptans, dicumyl peroxide, t-butyl peroxypivalate, lauroyl peroxide, di-tridecylthiodipropionate and Naugawhite ® were then added to the reactor and stirred for several minutes to obtain a uniform mixture, after which the suspending solution was added. The reactor was flushed twice with nitrogen and the pressure set at 30 psi. The mixture was agitated at 130 RPM while increasing the temperature to 173° F. This temperature was maintained for seven hours followed by increasing it to 245° F. for a further two hours. The reaction product was cooled, the resulting beads were filtered off and air dried for 24 hours at 170° F.

As in Examples 3–7 (and Comparative Examples I, II and III), samples of the product containing 1 part per hundred of Tinuvin P were subjected to accelerated aging to determine the chip impact strength of the product. The test data are set forth in Table 8 and are illustrated in FIG. 6.

EXAMPLE 21

This example, which is similar to Example 8, demonstrates the suitability of using, as the low-gel elastomer, a nitrile rubber instead of the SBR.

The recipe for this example was as follows:

| Material | Amount |
|---|---|
| Ratio SPS spine/SAN to Paracril ® BLT[1] | 70/30 |
| SPS spine/SAN latex[2] | 12.25 |

-continued

| Material | Amount |
| --- | --- |
| Paracril ® BLT[(1)] | 4.2 |
| Styrene | 56.8 |
| Acrylonitrile | 26.7 |
| Sunthene 250 | 3 |
| Dicumyl peroxide | 0.03 |
| Mixed tertiary mercaptans | 0.45 |
| t-butyl peroxypivalate | 0.20 |
| Di-tridecylthiodipropionate | 1.2 |
| Naugawhite ® | 0.4 |
| 0.6% [Natrosol 250HR/EDTA.Na$_3$:3/1] | 200 |

[(1)]A nitrile rubber (butadiene/acrylonitrile:67.5/32.5) having a specific gravity of 0.99 and a Mooney Viscosity ML-4 at 212° F. of 75, sold by Uniroyal, Inc.
[(2)]An 80/20 SPS spine/SAN latex graft prepared as in Example 2.

The main differences between this recipe and that of Example 8 is that in this example, the ratio of spine to low-gel elastomer is 70/30 instead of 80/20 and the nitrile rubber is substituted for the SBR as the low-gel elastomer.

The procedures used were the same as in Example 8.

As in Examples 3–7, 20 (and Comparative Examples I, II and III), samples of the product containing 1 part per hundred of Tinuvin P were subjected to accelerated aging to determine the chip impact strength of the product. The test data are set forth in Table 8.

TABLE 8

| | CHIP IMPACT STRENGTH TIME (HRS) | | | | | |
| --- | --- | --- | --- | --- | --- | --- |
| Sample | 0 | 50 | 100 | 250 | 500 | 1000 |
| Example 20 | 179 | 125 | 91 | 99 | 101 | 97 |
| Example 21 | 187 | 109 | 109 | 110 | 121 | 117 |

As can be seen from the data in Table 8, the chip impact strength of the products of Examples 20 and 21 are both quite good. After 250 hours of aging, both products are slightly inferior to that of Example 4, but superior to that of Comparative Examples II and IV.

EXAMPLES 22–26

The following examples, the recipes for which are set forth in Table 9, were run in the same manner as Example 3. Examples 22, 23 and 25 are directed to the use of grafted SPS spines, with Example 22 illustrating the use of a different catalyst, namely, t-butyl-peroxy neodecanoate, Example 23 illustrating the use of a 100% polybutadiene as the low-gel elastomer and Example 25 illustrating the use of a different SBR rubber (77/23 - butadiene/styrene) as the low-gel elastomer.

Examples 24 and 26 are directed to the use of grafted LPS spines, with Example 24 illustrating the use of a 100% polybutadiene as the low-gel elastomer and Example 26 illustrating the use of the 73/23 - butadiene/styrene rubber as the low-gel elastomer.

TABLE 9

| | EXAMPLES | | | | |
| --- | --- | --- | --- | --- | --- |
| Recipe | 22 | 23 | 24 | 25 | 26 |
| 80/20 SPS Spine/SAN latex | 13.8 | 11.4 | | 11.4 | |
| 80/20 LPS Spine/SAN latex | | | 11.25 | | 11.25 |
| Synpol 8107E | 3.5 | | | | |
| Synpol 1551 (a) | | | | 3.9 | 6.0 |
| Ameripol CB-220 (b) | | 3.9 | 6.0 | | |
| Styrene | 53.8 | 56.6 | 57.9 | 58.6 | 57.9 |
| Acrylonitrile | 28.9 | 28.1 | 24.8 | 28.1 | 24.8 |
| Sunthene 250 | 3 | 3 | | 3 | |
| Acetic acid | | | 0.3 | | 0.3 |
| Dicumyl peroxide | 0.02 | 0.05 | 0.05 | 0.05 | 0.05 |
| Mixed tertiary mercaptans | 0.45 | 0.43 | 0.21 | 0.43 | 0.21 |
| Lauroyl peroxide | | | 0.09 | | 0.09 |
| t-butyl peroxypivalate | | 0.3 | 0.18 | 0.3 | 0.18 |
| t-butyl peroxyneodecanoate | 0.20 | | | | |
| Di-tridecylthiodipropionate | 0.6 | 1.2 | 1.2 | 1.2 | 1.2 |
| Naugawhite R | 0.2 | 0.4 | 0.4 | 0.4 | 0.4 |
| 0.36% [0.15% Elvanol 50-42, 0.12% NaCl, 0.09% Sulframin 45s] | | | 200 | | 200 |
| 0.6% [0.45% Natrosol 259HR/0.15% EDTA.Na$_3$] | 200 | 200 | | 200 | |

(a) a low-gel styrene-butadiene rubber containing 77% butadiene and 23% styrene.
(b) a low-gel, 100% cis-polybutadiene.

The impact properties of the products of Examples 22, 23 and 25 are set forth below in Table 10.

TABLE 10

| | SAMPLE Examples | | |
| --- | --- | --- | --- |
| Property | 22 | 23 | 25 |
| ¼" NI (RT) ft.lbs./in. notch | 7.2 | 5.3 | 4.9 |
| ¼" NI (−20°) ft.lbs./in. notch | 2.4 | 1.3 | 1.3 |
| Heat Distortion Temperature (°F.) | 025 | 207 | 204 |
| Hardness (Rockwell R) | 98 | 104 | 105 |
| 350° F. Mooney | 61 | 62 | 56 |

Samples of the products of Examples 24 and 26, each containing 1 part per hundred by weight of Tinuvin P were subjected to accelerated aging as described above in connection with Examples 3–7. The test results are set forth in Table 11.

TABLE 11

| | CHIP IMPACT STRENGTH (in.lb./in.) TIME (HRS.) | | | | | |
| --- | --- | --- | --- | --- | --- | --- |
| Sample | 0 | 50 | 100 | 250 | 500 | 1000 |
| Example 24 | 178 | 142 | 109 | 123 | 122 | 116 |
| Example 26 | 194 | 145 | 118 | 118 | 114 | 108 |

Variations and modifications can, of course, be made without departing from the spirit and scope of the invention.

Having thus described our invention, what I desire to secure by Letters Patent and hereby claim is:

1. A method of making a polyblend, said method comprising suspension polymerizing 55 to 95% of a monovinylidene aromatic hydrocarbon and an alkenoic nitrile monomer with an at least partially cross-linked pre-grafted styrene-butadiene small or particle size or large particle size rubber spine latex, wherein the ratio of styrene to butadiene is from about 31/69 to 0/100 and said rubber spine is pre-grafted with a monovinylidene aromatic hydrocarbon or alkenoic nitrile monomer or mixtures thereof, and 0.25 to 22.5% of a low-gel elastomer selected from the group consisting of styrene-butadiene rubbers wherein the ratio of styrene to butadiene is from about 31/69 to 0/100 and acrylonitrile-butadiene rubbers wherein the ratio of acrylonitrile to butadiene is from about 15/85 to 50/50 in a suspending solution in an oxygen free atmosphere at a temperature of about 105°–250° F. in the presence of a catalytically effective amount of at least one polymerization initiator selected from the group consisting of peroxide initiators and azo initiators, at least one chain transfer agent, an antioxidant and a gelling agent to form a substantially completely polymerized product in the form of beads.

2. A method according to claim 1, wherein the pre-grafted styrene-butadiene rubber spine latex is 50 to 98% cross-linked and consists essentially of 0–10% of styrene and 90–100% of butadiene.

3. A method according to claim 2, wherein the degree of cross-linking is 80–90%.

4. A method according to claim 1, wherein the monovinylidenic aromatic hydrocarbon is styrene and the alkenoic nitrile is acrylonitrile, the ratio of styrene to acrylonitrile being 80/20 to 60/40.

5. A method according to claim 4, wherein the ratio is 70/30.

6. A method according to claim 1, wherein the low-gel elastomer is styrene/butadiene rubber in which the ratio of styrene to butadiene is from 0/100 to 10/90.

7. A method according to claim 1, wherein the low-gel elastomer is acrylonitrile/butadiene rubber in which the ratio of acrylonitrile to butadiene is from 40/60 to 15/85.

8. A method according to claim 1, wherein the polymerization initiator is at least one peroxide initiator selected from the group consisting of benzoyl peroxide, lauroyl peroxide, t-butyl peroxypivalate, t-butyl peroctoate, t-butyl perbenzoate, t-butyl peroxyneodecanoate and di-t-butyl peroxide and is present in the amount of about 0.1 to 0.5% by weight based on the total weight of the reactants when a single initiator is used and in the amount of about 0.05 to 0.25% by weight of each when more than one initiator is used.

9. A method according to claim 1, wherein the chain transfer agent is a mixture of tertiary mercaptans and is present in an amount of about 0.01 to 1.0% by weight based on the total weight of the reactants.

10. A method according to claim 1, wherein the gelling agent is a peroxide selected from the group consisting of dicumyl peroxide, di-t-butyl peroxide, t-butyl perbenzoate, t-butyl peroxy isopropyl carbonate, 2,2-bis-(t-butyl-peroxy)-diisopropylbenzene, 2,5-dimethyl-2,5-di-(t-butylperoxy)-hexane and 2,5-dimethyl-2,5-di-(t-butylperoxy)-hexyne-3, and is present in the amount of 0.02 to 0.5%.

11. A method according to claim 1, wherein the styrene-butadiene rubber latex spine is a small particle size spine and is present in a ratio of 2.5/97.5 to 43/57 with respect to the monovinylidene aromatic hydrocarbon, alkenoic nitrile monomer and the low-gel elastomer.

12. A method according to claim 1, wherein the styrene-butadiene rubber latex spine is a large particle size spine and is present in a ratio of 2.5/97.5 to 43/57 with respect to the monovinylidene aromatic hydrocarbon, alkenoic nitrile monomer and the low-gel elastomer.

13. A method according to claim 1, wherein the product is additionally blended with a resin separately prepared from at least one monoethylenically unsaturated monomer in an amount sufficient to reduce the total rubber content thereof to about 9–18% by weight.

14. A method according to claim 13, wherein the product is blended with styrene/acrylonitrile copolymer.

* * * * *